United States Patent Office

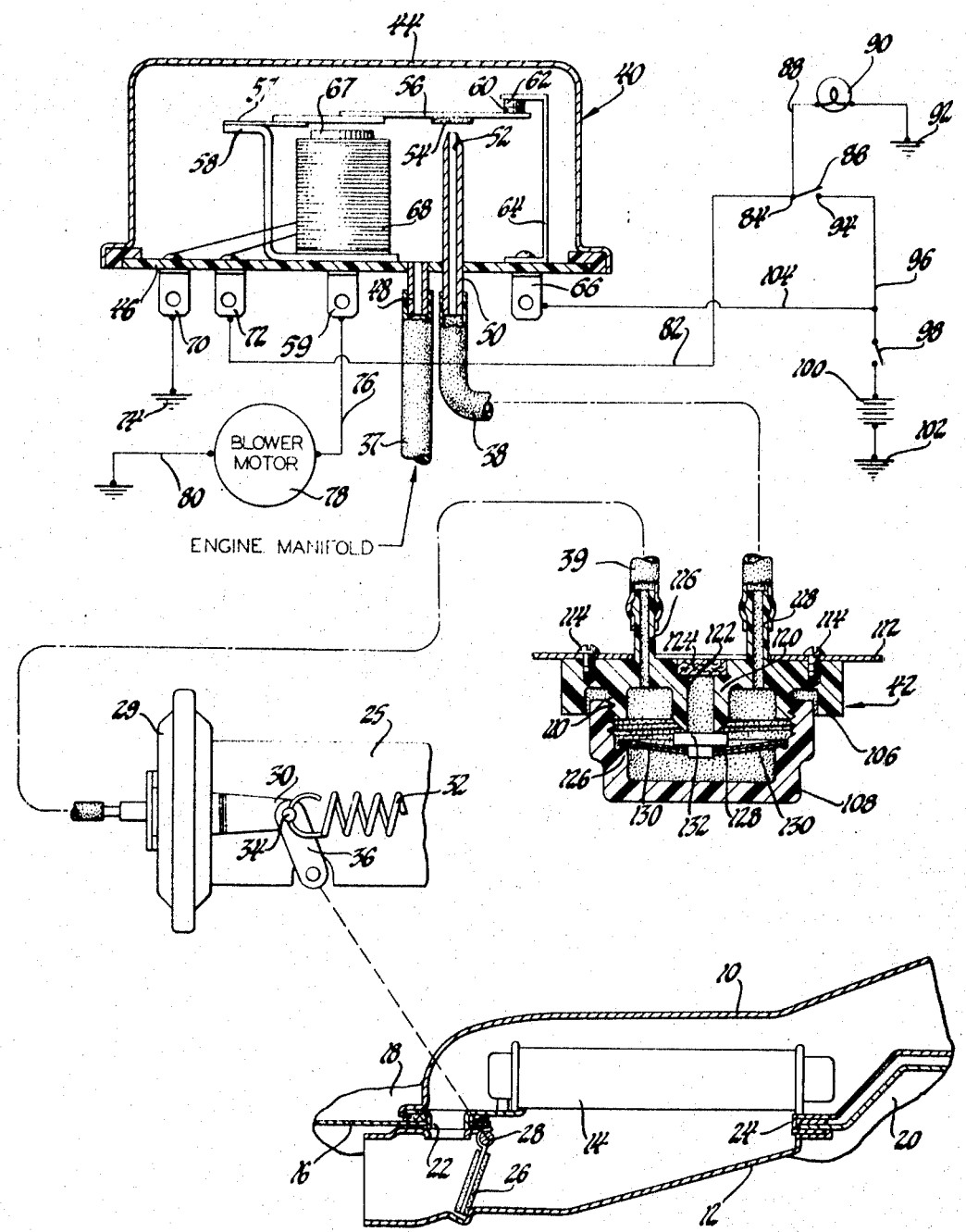

3,460,754
Patented Aug. 12, 1969

3,460,754
VACUUM TEMPERATURE CONTROL SYSTEM WITH HOLD
Jackson R. Templin and Thomas A. Zickel, Anderson, Ind., assignors to General Motors Corporation, Detroit, Mich., a corporation of Delaware
Filed Aug. 24, 1967, Ser. No. 663,071
Int. Cl. G05d 23/00
U.S. Cl. 237—2                                                                  1 Claim

ABSTRACT OF THE DISCLOSURE

An automobile passenger compartment temperature control system in which modulation of the temperature is dependent upon vacuum supplied by the engine and suitably varied and the control system having an electrically operated delay relay to de-activate or hold it from operation until the engine coolant is of adequate temperature for providing heat needed in the desired working of the system.

---

This invention relates to temperature control and more particularly to an improved temperature control system for vacuum regulation of heat supplied by engine coolant to an automotive passenger compartment.

A thermostatically controlled vacuum line for operating a vacuum motor suitably to modify a temperature is disclosed in the United States Patent 3,221,991 granted Dec. 7, 1965 in the name of R. W. Houser. The patent disclosure deals with a system having a thermostat in control which is effective unless a slave member associated with it must contend with a condition independent of the temperature to which the thermostat is exposed. Although other automatic control systems have been used heretofore which depend upon thermostatic control of a supply of vacuum to modify the heat supplied by engine coolant to air flow as in the United States Patent 2,304,642 granted Dec. 8, 1942 in the name of E. E. Hans, it has become desirable to provide a control system broadly of that nature but which is simpler, more effective, low in cost and which will not blow cold air into a passenger compartment when a car engine is in a warming-up period.

An object of the present invention is to provide an improved temperature control system which is automatically rendered inactive or caused to remain ineffective when the temperature of the heat source is too low thereby avoiding unpleasant effects upon car passengers during engine coolant cold or warm-up periods.

A feature of the present invention is an automotive temperature control system using modulated vacuum to effect automatic operation of a slave device such as a vacuum motor, and of a delay relay connected in the vacuum line whereby the system is rendered effective only when the temperature of the heat source is high enough to avoid cold blasts of air being introduced into a passenger compartment the temperature of which is to be controlled.

These and other objects and features of the invention will become apparent as the description proceeds.

In the drawings, the sole figure is a schematic view of major components of an automobile passenger compartment heating system as one embodiment of the present invention with duct work including a heater core being drawn to a reduced scale and portions being shown in section better to illustrate the construction and mode of operation.

Duct work 10 and 12 and the heater core 14 are shown as mounted on a vehicle firewall 16 separating an automotive engine compartment 18 from a passenger compartment 20.

The wall 16 is apertured at 22 for conveying unheated outside air to the compartment 20 and at 24 for conveying heated air from the core 14 to the compartment 20. Outside air from a blower (not shown) is conventionally received in the duct work 10 and a heat flow regulating element or damper 26 is shown pivoted on a shaft 28 and positioned to proportion or select the air flow from the apertures 22 and 24 for discharge from the duct work 12. This arrangement is similar to that disclosed in the United States Patent No. 3,084,866 granted Apr. 9, 1963 in the name of E. E. Keightley.

A bracket 25 is shown for supporting a slave device or diaphragm type vacuum motor 29. This motor, to which modulated vacuum may be applied, has a shaft projection 30 which is adapted to be moved in one linear direction by means of a spring 32 and in the opposite direction by means of a diaphragm in the motor. The spring end of the projection 30 is pivoted as at 34 to an arm 36 which is joined to the shaft 28 to produce rotation thereof. Movement of the projection 30 to the right by virtue of the spring 32 will cause the damper 26 to close the aperture 22 and to open the duct leading from the aperture 24. The position of the damper 26 as shown in the drawing is assumed when a high degree of vacuum is applied to the slave device 29.

In a vacuum line, three hoses 37, 38 and 39 are provided to connect the engine manifold, as a supply of crude vacuum, with a relay device 40, a thermostatic control unit 42 and a slave device or vacuum motor 29 in series.

The relay device 40 comprises a boxlike casing 44 which is tightly closed by a cover 46. This device is suitable to be supported in fixed position on the firewall of the vehicle and includes two nipples 48 and 50 for connection with the hoses 37 and 38 of the vacuum line. The nipple 50 is such as to extend a distance within the casing 44 and end in a port 52 normally spaced from a soft pad 54 on an arm 56. One end of the arm is fixed to a bracket 58 bearing a terminal 59 extending through the cover 46. The other end of the arm 56 bears a contact 60 normally held against a second contact 62 because of bias into the bracket 58 and a hinge portion 57. The contact 62 is supported on a bracket 64 which in turn is connected to a terminal 66. The core 67 of a solenoid is arranged in facing relation with a magnetic portion of the arm 56 to be attracted thereby when a coil 68 of the solenoid is energized. The two ends of the coil are connected to two terminals 70 and 72 and the terminal 70 is grounded as at 74. The terminal 59 is connected by a line 76 to a blower motor 78 which in turn is grounded by a line 80. It will be understood that the blower referred to is the one for forcing outside air into the duct work 10. The terminal 72 is connected by a line 82 to one pole 84 of a two-pole engine cold light switch 86. This same pole is connected by a line 88 through a signal lamp 90 to a ground at 92. The other pole 94 of the switch 86 is connected by a line 96 through an ignition switch 98 to a battery 100 which in turn is grounded as at 102. The terminal 66 is connected by a line 104 to the line 96.

A suitable switch 86 is disclosed in the United States Patent 2,751,464 granted June 19, 1956 in the names of B. H. Short and G. B. Shaw.

The thermostatic control unit 42 comprises a plastic base 106 and a plastic cover 108 which are threaded together as at 110. The unit 42 is supported on the instrument panel 112 of the vehicle by means of screws 114 and the panel 112 is apertured for receiving two nipples 116 and 118 for connecting the hoses 39 and 38 respectively. Integral with the base 106 is a hollow boss 120 which provides an inlet bore 122 for the admission of a small amount of passenger compartment air to the interior

3 of the unit 42. A disk 124 of filter material is provided to insure that no foreign matter enters the unit. An annular shoulder 126 within the cover 108 supports the periphery of a bimetal 128 which is apertured as at 130. The apertures insure that air entering through the bore 122 will contact both sides of the bimetal 128 as will be understood as the description proceeds. Fixed to the center of the bimetal 128 is a valve pad 132 which is adapted at the proper time to seat on the end of the hollow base 120 to close the air inlet bore 122.

As heretofore indicated, the purpose of the relay 40 is to deactivate the automatic temperature control system when the engine coolant is not of sufficiently elevated temperature to supply the needed heat to the passenger compartment.

In normal operation, that is, when the engine coolant temperature is above 110° F., the vacuum of the engine manifold connected by the hoses 37, 38 and 39 to the slave device 29 causes the latter to position the damper 26 in accordance with the temperature of the passenger compartment as dictated by the bimetal 128 in the unit 42. When the air leaking into the passage 122 equals the flow through the port 52, there is no vacuum in motor 29. When the passage 122 is closed by the pad 132, full manifold vacuum is applied to the motor. Depending on the leak into passage 122, therefore, the motor or slave device 29 may be provided with from zero to full manifold vacuum. The current will flow from a battery 100 through the ignition switch 98 and contacts 60 and 62 and operate the motor 78. The usual blower switch is omitted from the drawing as it forms no part of the invention. Under these conditions, the relay 40 has no blocking function and the degree of vacuum determined by the unit 42 will suitably position the damper 26.

In the event, however, that the engine coolant is at a temperature less than 100° F., the cold light switch 86 will be closed. This will energize the coil 68 as well as the cold lamp 90 and prevent operation of the blower motor 78 by opening of the contacts 60 and 62. No cold air at this time will be forced by the blower through the duct work 10 and 12 into the passenger compartment 20. At the same time, the movement of the armature part of the arm 56 will cause the sealing pad 54 to press against the port end of the nipple 50 blocking vacuum flow into the control unit 42. This condition of the system will obtain until the cold light switch 86 opens, i.e., at the termination of the engine warm-up period. When the cold light switch 86 opens, the relay device 40 drops out and the vacuum control system operates normally.

The specific features of the vacuum control system exclusive of the relay device 40 may be varied appreciably from the specific arrangement disclosed for the double function relay 40 could be used in any application requiring vacuum modulated by a device such as the unit 42 for the operation of a slave device under given conditions.

We claim:
1. An automotive temperature control system comprising: a normally closed air mix damper in duct work which directs air into a passenger compartment from a heater core; said air mix damper pivotal from a normally closed position to mix heated air with cool ambient air for regulating the temperature of air flowing into the passenger compartment; a vacuum motor linked to said air mix damper to pivotally move said damper; a thermostatic control unit having a bimetal vacuum valve responsive to the temperature of passenger compartment air to modulate vacuum strength applied to said vacuum motor through a vacuum line; a relay device having a sealed interior space connected to a vacuum source such as an engine intake manifold and to said thermostatic control unit by a pair of vacuum lines; a motor driven blower for moving air through the heater core and the duct work into the passenger compartment;

a pair of normally closed contacts in said interior space of the relay connected to a battery power source and to said blower motor; a flexible conductor arm mounted at one end in said interior space having a free end; one of said contacts mounted on said free end for movement therewith to open said contacts and deactivate said blower motor; a hollow nipple having an end with a normally open port extending into said interior space of the relay and connected at the other end to one of said pair of vacuum lines;

a pad mounted on said conductor arm positioned so as to block said normally open port of said nipple when said flexible conductor arm moves to open said contacts; a cold light switch responsive to engine coolant temperature to energize a cold light signal lamp when the coolant temperature falls below a predetermined value; a solenoid coil within said interior space of the relay positioned to attract said flexible conductor when energized; said solenoid coil being energized by said cold light switch simultaneously with said cold light signal lamp to open said contacts and block said port with said pad whereby the blower motor is deactivated and vacuum is blocked from said vacuum motor so as to maintain the air mix damper in its normally closed position during periods when said light signal lamp is energized.

References Cited
UNITED STATES PATENTS

| | | |
|---|---|---|
| 2,808,993 | 10/1957 | Simons. |
| 3,051,393 | 8/1962 | Hartzell. |
| 3,319,888 | 5/1967 | Creager. |
| 3,221,991 | 12/1965 | Houser _____ 236—87 |
| 3,373,934 | 3/1968 | Kolbe et al. |

EDWARD J. MICHAEL, Primary Examiner

U.S. Cl. X.R.

236—13, 87